United States Patent
Myers

(10) Patent No.: US 6,758,284 B2
(45) Date of Patent: Jul. 6, 2004

(54) STRUCTURE FOR CONVERTING AN INTEGRAL IMPLEMENT TO A DRAWN TYPE

(75) Inventor: Brian E. Myers, Altoona, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/298,619

(22) Filed: Nov. 15, 2002

(65) Prior Publication Data

US 2004/0094313 A1 May 20, 2004

(51) Int. Cl.$^7$ ............................................. A01B 63/10
(52) U.S. Cl. ........................ 172/311; 172/388; 172/452
(58) Field of Search ................................ 172/310, 311, 172/388, 452, 507, 669, 776; 37/439

(56) References Cited

U.S. PATENT DOCUMENTS

| | | | | |
|---|---|---|---|---|
| 2,704,021 A | * | 3/1955 | Brundage | 280/43.23 |
| 4,364,581 A | * | 12/1982 | Shoup | 172/311 |
| 4,418,762 A | * | 12/1983 | Page | 172/311 |
| 4,492,272 A | * | 1/1985 | Jensen | 172/178 |
| 5,291,954 A | * | 3/1994 | Kirwan | 172/311 |
| 5,409,069 A | * | 4/1995 | Hake | 172/400 |
| 5,429,195 A | * | 7/1995 | Turnis | 172/311 |
| 5,890,546 A | * | 4/1999 | Kerpash, Sr. | 172/684.5 |
| 6,119,792 A | * | 9/2000 | Almer | 172/799.5 |
| 6,213,034 B1 | * | 4/2001 | Raducha et al. | 111/57 |
| 6,382,326 B1 | | 5/2002 | Goins et al. | 172/239 |
| 6,408,950 B1 | * | 6/2002 | Shoup | 172/311 |
| 6,557,646 B1 | * | 5/2003 | Hurtis et al. | 172/156 |

OTHER PUBLICATIONS

Blu–Jet Sub Tiller III literature, one page, date unknown, printed Sep. 16, 2002.
Krause Corporation 4830 Series In Line Ripper literature, two pages, date unknown, printed Sep. 16, 2002.
CASE IH, Yield–Till System Ecolo–Til 2500 literature, eight pages, publication date 2000, published in U.S.A.
Deere & Company, patent application filed on Nov. 15, 2002 entitled "Parallel Cylinder Lift Structure for an Implement".

* cited by examiner

Primary Examiner—Brain Myers
Assistant Examiner—Alexandra K. Pechhold

(57) ABSTRACT

Attachment structure for converting an integral implement to a pull-type implement includes wheel modules which can be placed at different locations along the frame to avoid interference with tool standards or other hardware. Each module includes both a forward gauge wheel and a rearward transport wheel. The transport wheels are located behind the center of gravity of the implement for stability, and the forwardly located gauge wheels offset the moment resulting from standard draft. A hitch storage jack doubles as a gauge wheel adjustment tool. To maintain the wheels in phase and provide a transport lock-up feature, a simple parallel circuit with pilot operated check valves on the base or lift end of each cylinder is utilized.

19 Claims, 5 Drawing Sheets

STRUCTURE FOR CONVERTING AN INTEGRAL IMPLEMENT TO A DRAWN TYPE

FIELD OF THE INVENTION

The present invention relates generally to agricultural implements such as rippers, and more specifically to wheel structure for such implements.

BACKGROUND OF THE INVENTION

Agricultural implements such as deep tillage rippers often are towed by a large four-wheel drive (4WD) tractor, especially if the implement is a larger unit with nine or more standards. A problem can arise when the operator desires to pull an integral ripper, which is normally mounted on a three point tractor hitch, since many 4WD tractors in the size range necessary are not equipped with such a hitch. It is often desirable to have a means of converting an integral ripper to a pull-type unit. Consequently, a drawn hitch attachment is needed for the larger sized rippers, and compatibility with smaller rippers such as those with five or seven standards is advantageous.

Numerous hitch attachments are available for converting an integral ripper to a pull-type ripper. Such attachments typically include a hitch assembly that pins into the existing lower hitch plates of the ripper. A turnbuckle is placed from the upper link attachment location on the ripper to an upper surface of the hitch to facilitate horizontal adjustment of the machine front-to-rear for compensating for different tractor drawbar heights. Independent wheel packages are generally placed off the front of the ripper, one on each side, with a forward acting wheel arm and dual tandem wheels.

Hitch attachments for conversion from integral to pull-type can produce some very undesirable conditions. A light hitch condition often results from placement of the majority of the implement weight behind the wheels, a condition that produces high vertical hitch loads on the tractor drawbar in the upward direction. The high vertical loads, in turn, produce high axial loads which pass through the turnbuckle. Other negative attributes of the forwardly located wheels include unstable transport conditions and high stresses on certain areas of the implement frame. A further problem with some wheel arrangements is instability or oscillation of the implement while operating in the field as the front of the frame tends to nose downwardly and then rock back upwardly under certain field conditions.

To eliminate some of the problems, placement of the transport wheels near the rear of the machine is helpful. However, numerous obstacles on the rear of the implement frame limit such wheel placement. Placement of the wheels at the rear of the implement creates undesirable moments tending to rotate the front of the frame downwardly. Maintaining proper machine attitude and uniform working depth is a problem.

Using wheels at both the front and the rear of the implement present numerous problems, including the provision of an economically feasible wheel lift and timing system. Hydraulic controls for all the wheels can be expensive and very complex. Manually adjustable gauge wheels often are difficult to fine tune, particularly when the implement is relatively large and heavy. Providing conversion hitch attachments therefore has presented numerous challenges to the implement designer.

A problem with independent wheel modules, regardless of wheel location, is need for structure to keep the wheels timed. A mechanical timing tube is often impractical because of interference with machine components.

SUMMARY OF THE INVENTION

It is therefore an object of the present invention to provide an improved attachment structure for conversion of an integral implement to a pull-type implement. It is a further object to provide such a structure which overcomes most or all of the aforementioned problems.

It is another object of the present invention to provide an improved attachment structure for conversion of an integral implement to a pull-type implement which is relatively low in cost and complexity. It is yet another object to provide such a structure having improved stability, better depth control consistency, reduced stress and reduced front to rear instability or oscillation problems compared to at least most previously available structures.

It is a further object of the invention to provide an improved attachment structure for conversion of an integral implement to a pull-type implement having a compact, economical design which facilitates a variety of tool spacings without interference. It is another object to provide such a structure which is compatible with large implements such as rippers with up to nine standards or more as well as with smaller implements such as rippers with five or seven standards.

It is yet another object of the invention to provide an improved attachment structure for conversion of an integral implement to a pull-type implement, the structure having a rearward acting transport wheel and a forward acting gauge wheel. It is a further object to provide such a structure having a simple and inexpensive lift system.

Attachment structure described below for converting an integral implement to a pull-type implement includes wheel modules which can be conveniently mounted at different locations along the implement frame depending on the number and spacing of tools. Each module supports both a forward gauge wheel and a rearward transport wheel. The module includes a lower wheel bucket or channel, in which a rear wheel arm rotates, and an upper mast or tower. The tower captures the base end of a hydraulic cylinder used to raise and lower the rear transport wheels. The tower additionally contains a sliding mechanism for a front gauge wheel yoke. Mounting hardware secures each tower and bucket to the desired location on the front rank tube of the implement.

The transport wheels are located behind the center of gravity of the implement to provide a substantial improvement in stability and reduced frame stress. The placement of the wheels achieves the desired amount of downward force on the tractor drawbar. The forwardly located gauge wheels offset the moment resulting from the ripper standard draft that rotates the front of the implement downwardly to stabilize the machine in working conditions. Normal field working depth is set by lowering the machine into the ground to the desired depth using the hydraulically controlled rear wheels. Cylinder stops are then placed on the depth control cylinders, and the front gauge wheels lowered into contact with the ground. However, because of the weight and size of the implement, fine tuning the gauge wheel position requires considerable force. To economically provide the necessary mechanical advantage, the hitch storage jack is made to double as a gauge wheel adjustment tool. The jack slides onto a post mounted on the upper tower and pushes against a clip mounted on the side of the gauge wheel yoke.

To prevent the transport wheels on the wheel modules from getting out of phase, a hydraulic system includes a parallel circuit with pilot operated check valves on the base or lift end of each cylinder. The check valves lock hydraulic fluid into the base end of each cylinder and prevent uneven loads from changing the relative extension of the cylinders. The pilot is operated off the rod or lower end of each cylinder. Therefore, when the machine is lowered, the check valve opens and allows oil flow out of the base end. An orifice is used to provide the optimum breakoff pressure for the check valve.

The rearward placement of the transport wheels creates very stable transport conditions. The wheel modules can be widely spaced for additional stability. Working depth accuracy and machine stability in the field is greatly improved because of the spacing of the four wheels, and the combination of the front and rear wheel support during tillage operations reduces or eliminates the oscillations of the type wherein the frame noses downwardly and then rocks back upwardly. The rear wheels can be used to set the desired working depth hydraulically. The wheel structure provides excellent support for the frame when the implement includes rear mounted tools such as leveling wheels or rolling basket attachments. By mounting two independent wheels to each wheel module, costs and complexity are minimized. Utilizing the hitch storage jack for gauge wheel adjustment results in a unique, cost-effective and user-friendly drawn hitch attachment. The hydraulic system eliminates need for costly rephasing cylinders and avoids the high reaction forces of a traditional master-slave series circuit. If desired, the hydraulic lock-up valve normally used during storage and machine maintenance can be eliminated because the check valves provide the same function.

These and other objects, features and advantages of the present invention will become apparent to one skilled in the art upon reading the following detailed description in view of the drawings.

DESCRIPTION OF THE PREFERRED EMBODIMENT

Figure 1:
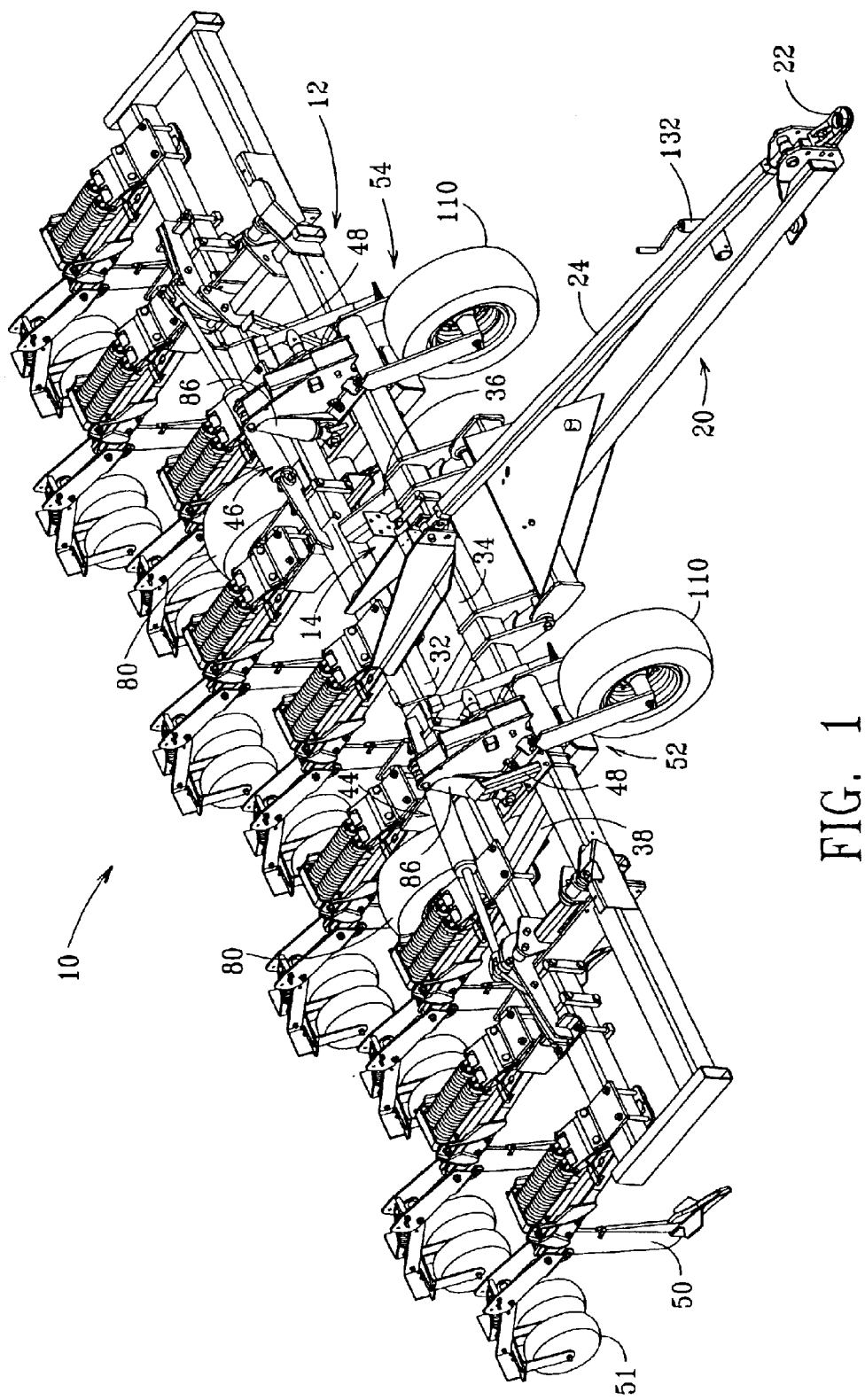
FIG. 1 is a front perspective view of a tillage implement with hitch and wheel module structure attached.

Referring now to FIG. 1, therein is shown an implement 10 such as a ripper or similar deep tillage implement having a main frame 12 and conventional three-point hitch structure 14 adapted for attachment to a three-point hitch (not shown) on a tractor or other towing vehicle. The implement 10 is shown with attachments for conversion to a towed implement. A hitch 20 is pivotally connected at a rearward end to the lower two attaching points of the three-point hitch structure 14. A standard towing connection 22 for attachment to the tractor drawbar is connected to the forward end of the hitch 20. A leveling link 24 extends between the towing connection 22 and the upper connection of the three point hitch structure 14 to provide a generally rigid but adjustable hitch connection to the frame 12.

The frame 12 as shown includes transversely extending front and rear frame members 32 and 34 connected by generally fore-and-aft extending frame members such as shown at 36 and 38. Wing frame sections 40 and 42 are pivotally attached at the ends of the main frame 12 and are pivotable from the working position shown upwardly and inwardly to a folded transport position by wing lift assemblies 44 and 46. The wing frame sections rest on frame-mounted supports 48 in the transport position. Ripper standards 50 (FIG. 1) or other earth-engaging tools are connected at transversely spaced locations to the frame members 32 and 34 and the wing frame sections 40 and 42. The tools can include rear mounted rolling baskets or leveling wheels such as shown at 51 which tend to move the center of gravity of the implement rearwardly.

To provide frame support, lift and depth control functions when the implement 10 is converted from integral to towed, first and second wheel modules 52 and 54 are transversely spaced on the forward member 34 of the main frame 12. The modules 52 and 54 are self-contained and are generally identical. Therefore, only the module 52 will be described in detail below.

The module 52 (FIG. 2) includes bracket structure 60 for attaching the module at selected one of various locations along the front frame member 34, depending on the locations of the tools 50 and other hardware on the frame. The bracket structure 60 includes a downwardly and rearwardly opening lower channel member 62 having an apertured top 64 through which mounting bolts 66 extend. The apertures are spaced so that the bolts 66 are spaced in the fore-and-aft direction a distance approximately equal to the wall spacing on the frame member 34, and additional apertures are provided to accommodate other frame tube sizes. The threaded ends of the bolts 66 project upwardly through corresponding apertures in a lower flanged section 68 of an upper tower member or mast 70. Nuts 72 are threaded onto the ends and tightened to secure the bracket structure 60 at the selected location on the frame member 34.

The forward end of a lift wheel arm 76 is pivotally connected at 78 between the sides of the channel member 62 for rocking between a generally horizontal raised working position and downwardly directed lowered transport position. The lower end of the arm 76 is bifurcated and rotatably mounts a lift wheel 80. The lift wheel arm 76 includes a cylinder bracket 82 pivotally connected to the rod end 84 of a lift cylinder 86. The base end of the lift cylinder 86 is pivotally connected to the upper aft end of the mast 70.

The mast 70 includes transversely spaced sides 90 with a downwardly and rearwardly opening pivot area 92 pinned to the base end of the cylinder 86. A rectangular arm guide area 96 extending diagonally upwardly in the rearward direction is defined between the mast sides 90 and a plate 98 connected between the top edges of the sides at forwardmost locations 100. A mating gauge wheel arm 106 is slidably mounted in the guide area 96 for sliding diagonally relative to the mast 70. The lower end of the gauge wheel arm 106 is connected to a yoke or wheel support 108 and rotatably mounts a gauge wheel 110 which extends downwardly and forwardly of the frame member 34.

Figure 2:
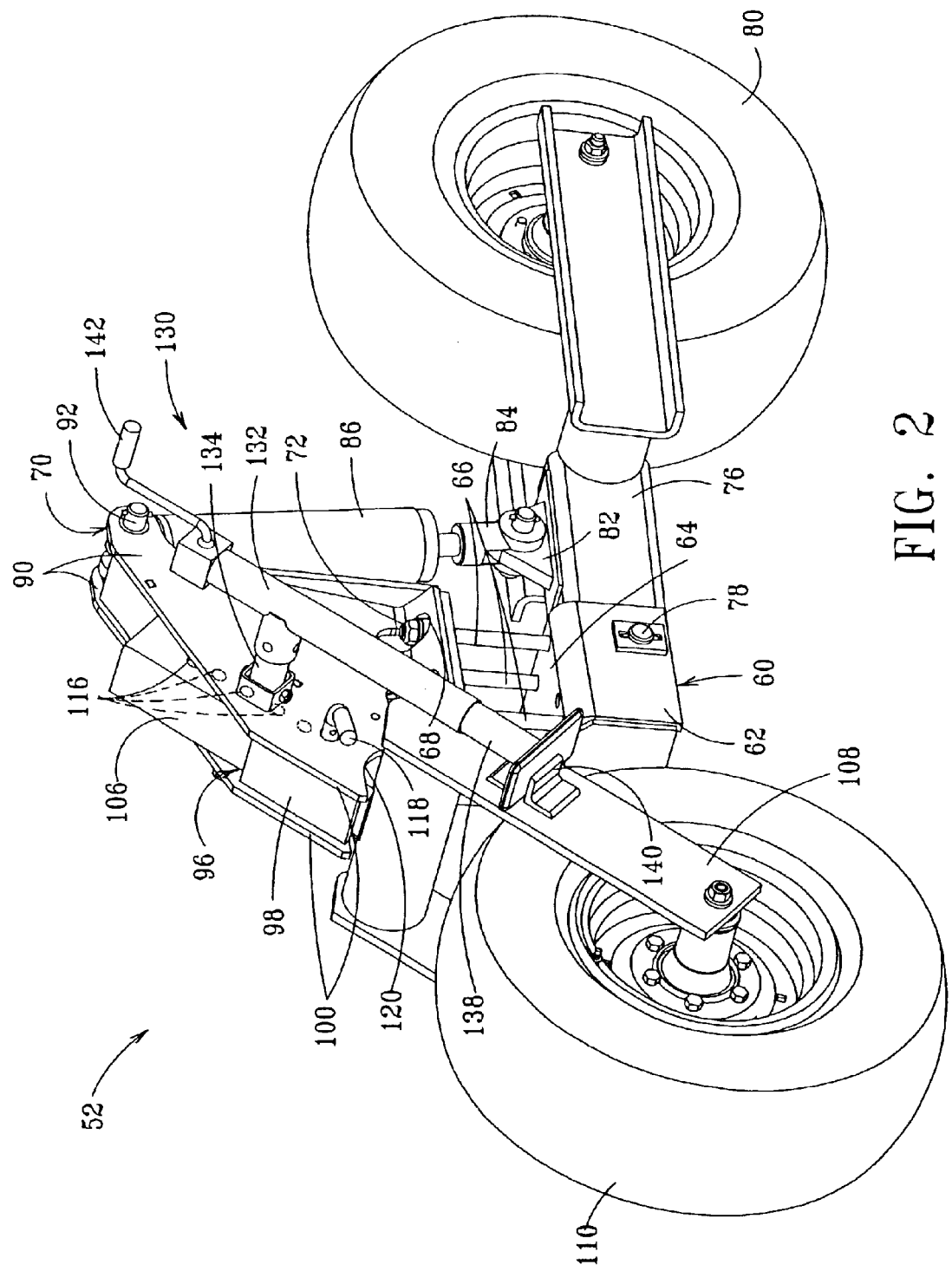
FIG. 2 is an enlarged front perspective view of one of the wheel module structures of FIG. 1.
Figure 3:
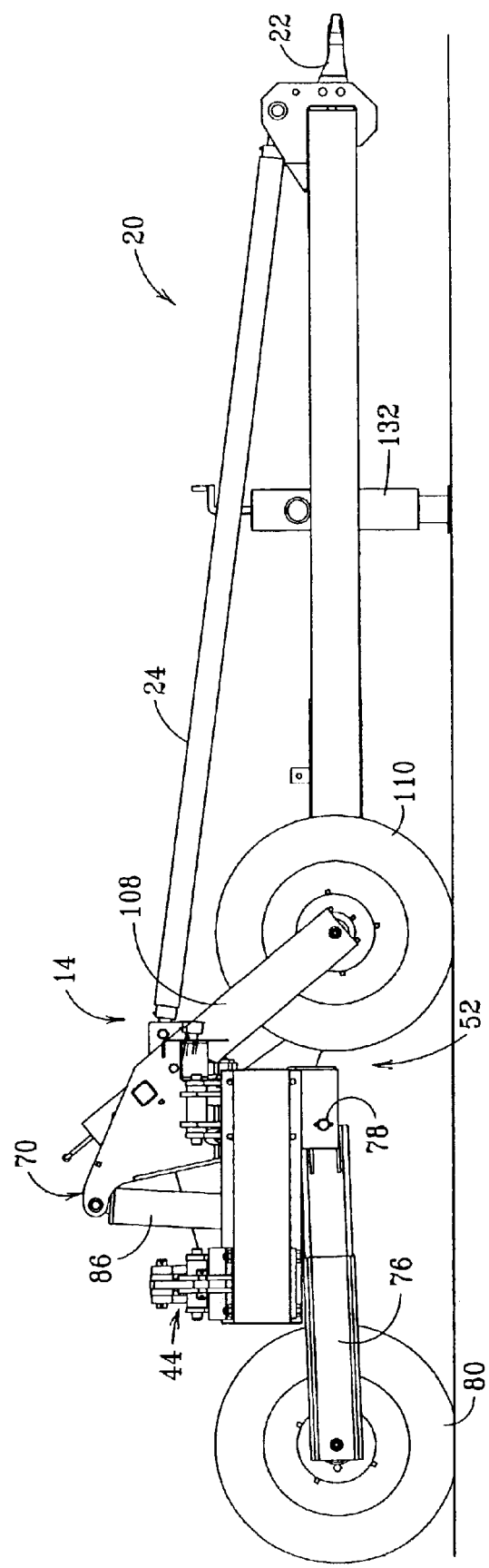
FIG. 3 is a side view of the implement of FIG. 1 in the lowered working position.
Figure 4:
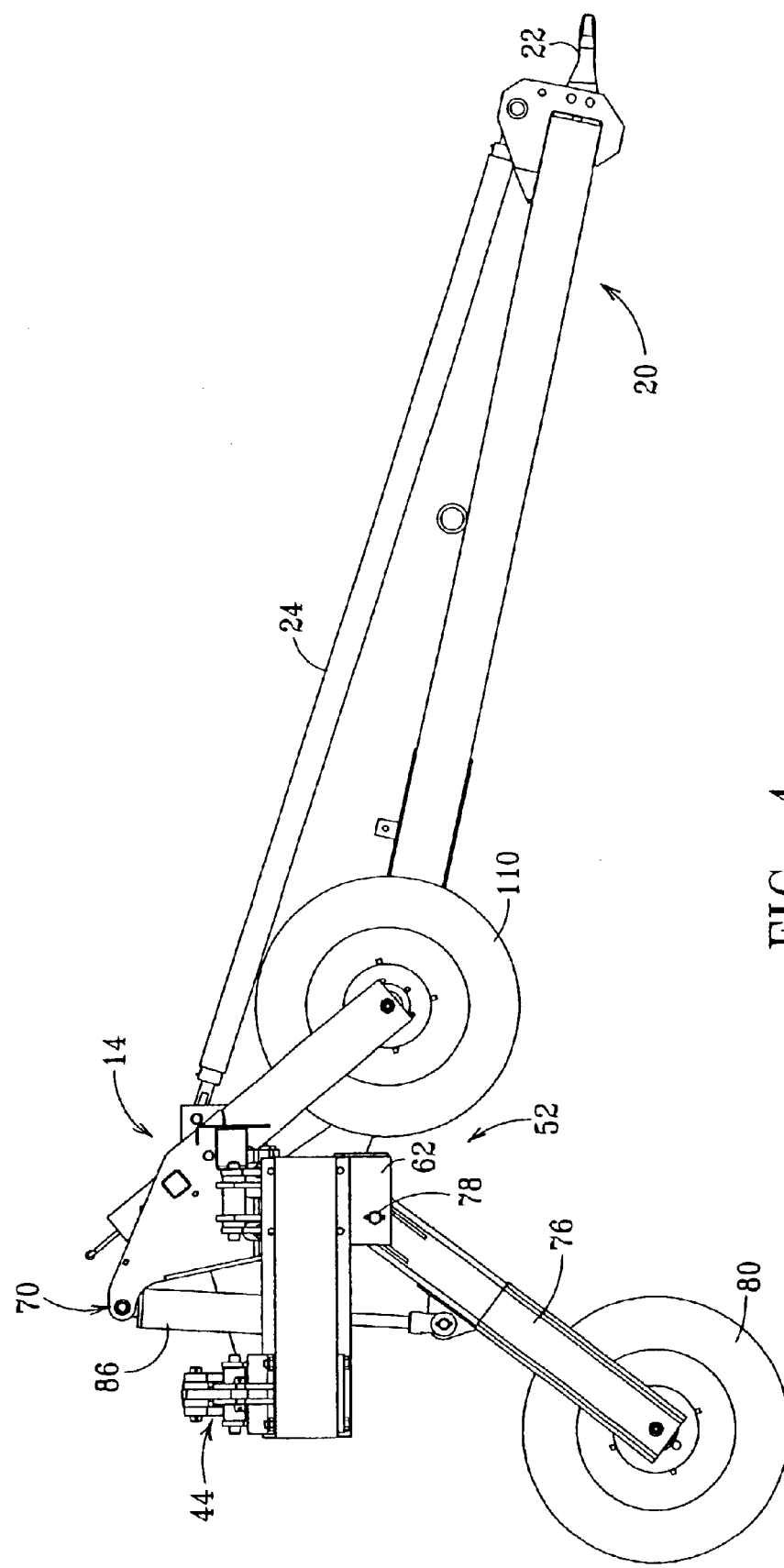
FIG. 4 is a view similar to that of FIG. 3 but showing the position of the wheels in the raised transport position.

As shown in FIG. 2, the upper end of the arm 106 is located above the frame member 34 and adjacent pivot area 92 when the gauge wheel 110 is adjusted for maximum working depth. The lower, forward ends of the sides 90 include arcuate cut-out areas 120 for receiving a bight portion of the yoke 108. The sides of the arm 106 are apertured at 116 to receive a pin 118 which extends through the selected set of apertures 116 and apertures in the spaced sides 90. By aligning a different set of apertures 116 with the apertures for the pin 118, the working height of the frame 12 can be adjusted. The depth adjustment range of the gauge wheel 110 is substantially less than the lift range of the lift wheel 80 between full retraction and full extension of the cylinder 86. When the cylinders 86 are fully extended and the implement 10 is in the raised transport position (FIG. 4), the gauge wheels 108 are lifted from the ground, and the frame 12 is supported by the wheels 80 behind the center of gravity of the implement and by the forwardly extending hitch 20.

Normal field working depth is set by lowering the frame 12 by retracting the hydraulic cylinders 86 to raise the rear transport wheels 80 until the tools 50 penetrate the ground to the desired depth. Cylinder stops (not shown) are then placed on the rods depth control cylinders or another standard stop arrangement to set the working position of the wheels 80 relative to the frame 12. The pin 118 is removed to allow the gauge wheel arm 106 to slide downwardly and forwardly until the gauge wheel 110 is lowered into contact with the ground. To move the gauge wheel firmly into contact with the ground, jack structure 130 is provided. A standard hitch jack 132 is supported from one side 90 of the mast 70 by a side support member 134 extending between an outer tube of the jack 132 and the side 90. A telescoping lower base section 138 of the jack 132 is supported from one side of the gauge wheel support 108 by a support bracket 140. Rotation of a jack handle 142 extends the base section 138 to urge the gauge wheel downwardly against the ground. The operator then inserts the pin 118 through the apertures in the sides 90 and through the aligned set of apertures 116 in the gauge wheel arm 106 to secure in the gauge wheel in the adjusted working position. The gauge wheels 110 extend forwardly of the frame member 34 and offset the moment resulting from the tool standard draft that tends to rotate the front of the implement downwardly.

Figure 5:
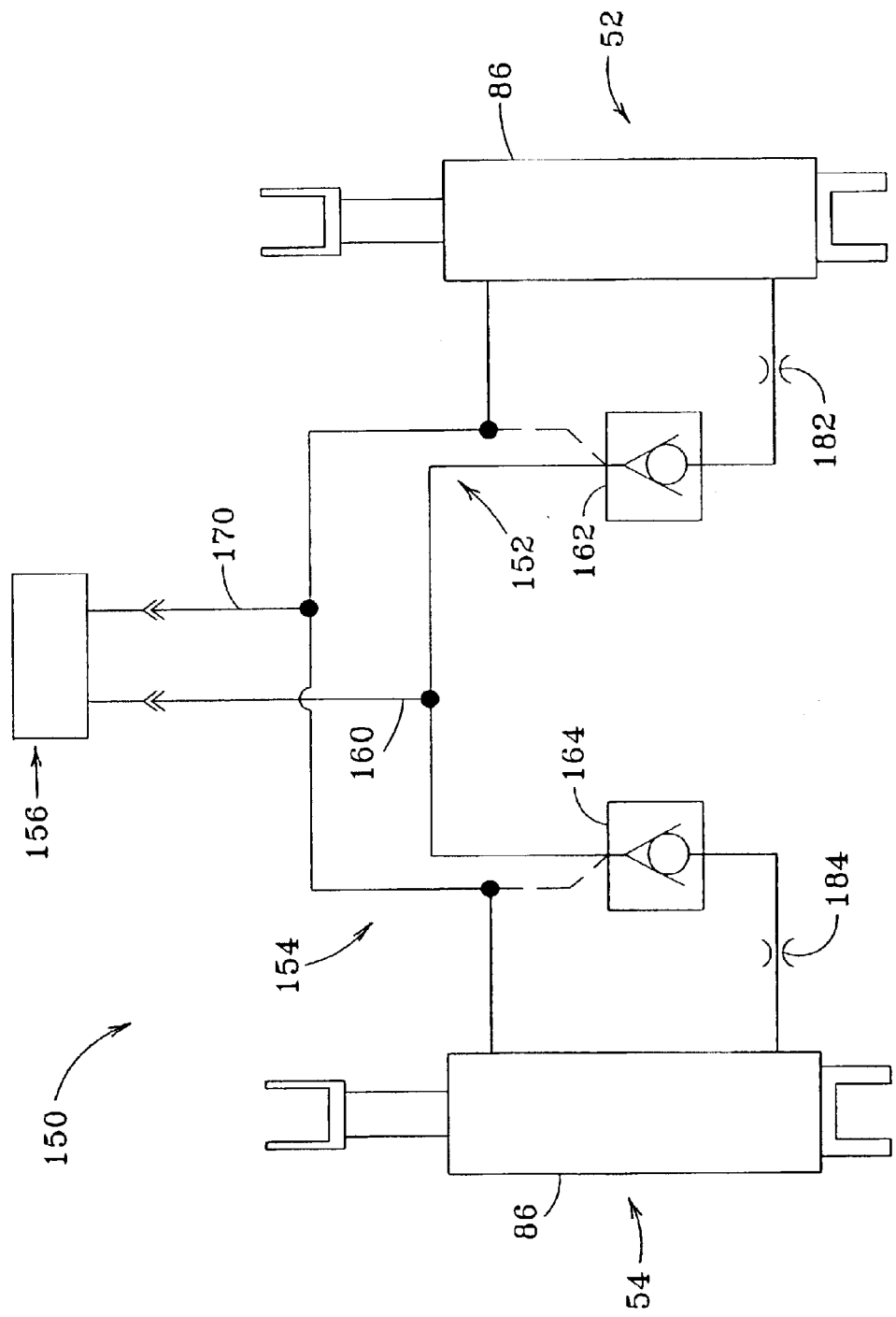
FIG. 5 is a schematic of a hydraulic circuit for use with the tillage implement of FIG. 1.

To prevent the transport wheels 80 on the wheel modules from getting out of phase as differing forces act on the cylinders 86, a hydraulic system indicated generally at 150 in FIG. 5 is provided. The system 150 includes hydraulic lines 152 and 154 connecting the cylinder 86 of the first wheel module 52 in parallel with the cylinder of the second wheel module 54 to a controllable source of hydraulic fluid under pressure 156 on the towing vehicle. A pressure line 160 is connected through first and second pilot operated check valves 162 and 164 to the base or lift ends of the cylinders 86. The rod ends of the cylinders 86 are connected to a return line 170 and provide fluid flow from the rod ends to reservoir as the cylinders 86 are extended. The source 156 can be a conventional hydraulic control system on a tractor with a selective control valve (SCV) or similar valve structure allowing for controlling flow and pressure in the lines 152 and 154. When pressure is applied to the valves 162 and 164 through the line 160, the check valves allow flow to the base ends so the cylinders 86 extend and move the transport wheels 80 downwardly relative to the frame 12.

The check valves 162 and 164 include pilot lines 172 and 174 connected to the line 170. When the operator wishes to retract the cylinders 86 to lower the frame 12, the selective control valve (not shown) on the towing vehicle is operated to pressurize the rod end line 170 and return the line 160 to reservoir. Normally, the check valves 162 and 164 prevent return flow from the base ends of the cylinders 86. However, when the fluid pressure in the line 170 reaches a valve breakoff level as sensed by the valves via the pilot lines 172 and 174, the check valves will open to allow return flow from the base ends so the cylinders 86 can retract to lower the frame 12. The check valves 162 and 164 prevent uneven loads on the cylinders 86 from changing relative extension of the cylinders so the cylinders remain in phase. Orifices 182 and 184 are inserted in the lines at the base ends of the cylinders 86 to provide the optimum breakoff pressure for the check valves 162 and 164. Hydraulic lock-up valves normally used during storage and machine maintenance can be eliminated because the check valves 162 and 164 provide the same function.

Having described the preferred embodiment, it will become apparent that various modifications can be made without departing from the scope of the invention as defined in the accompanying claims.

I claim:

1. Wheel structure for attachment to a transversely extending frame member of an implement supporting tools and adapted to be stored in a parked position, towed forwardly over the ground in a raised transport position, and towed forwardly over a field in a lowered working position with tools engaging the soil, the wheel structure comprising:
   a wheel frame;
   bracket structure for selectively attaching the wheel frame at one of a plurality of positions along the frame member;
   a rearwardly extending lift wheel structure pivotally connected to the wheel frame;
   forwardly extending gauge wheel structure connected to the wheel frame forwardly of the lift wheel structure; and
   a lift motor connected between the bracket structure and the lift wheel structure and operable to pivot the lift wheel structure to move the implement between the raised transport position and the lowered working position, wherein in the lowered working position the gauge wheel structure and the lift wheel structure support the frame member and resist torsional moments caused by the engagement of the tools with the soil and in the transport position the lift wheel structure supports the implement with the gauge wheel structure raised from the ground.

2. The wheel structure as set forth in claim 1 wherein the gauge wheel structure includes an arm slidably received by the bracket structure, and a jack device connected between the arm and the bracket structure for sliding the arm relative to the bracket structure to adjust the working position of the implement.

3. The wheel structure as set forth in claim 2 wherein the jack device comprises a storage jack which is removable from the arm and bracket structure for supporting a portion of the implement when the implement is in the parked position.

4. The wheel structure as set forth in claim 1 wherein the bracket structure includes a mast portion which, when the bracket member is attached, extends above the frame member, the mast including an arm support, and the gauge wheel structure includes an arm adjustably received by the arm support.

5. The wheel structure as set forth in claim 4 wherein the arm is slidably received by the arm support, and jack structure extending between the mast portion and the gauge wheel structure for adjusting the working position of the implement.

6. The wheel structure as set forth in claim 5 wherein the jack structure comprises a storage jack selectively connectible between the mast portion and the gauge wheel and repositionable to support the implement in the parked position.

7. Wheel structure for attachment to a transversely extending frame member of an implement supporting tools and adapted to be stored in a parked position, towed forwardly over the ground in a raised transport position, and towed forwardly over a field in a lowered working position with tools engaging the soil, the wheel structure comprising:
a wheel frame;
bracket structure for selectively attaching the wheel frame at one of a plurality of positions along the frame member, the bracket structure including a lower support and an upper support and connecting structure extending between the upper and lower supports for mounting the bracket structure on the frame member;
a rearwardly extending lift wheel structure pivotally connected to the lower support;
forwardly extending gauge wheel structure connected to the upper support; a hydraulic cylinder connected between the upper support and the lift wheel structure and operable to pivot the lift wheel structure to move the implement between the raised transport position and the lowered working position, wherein in the lowered working position the gauge wheel structure and the lift wheel structure support the frame member and resist torsional moments caused by the engagement of the tools with the soil; and
wherein the gauge wheel structure includes an arm slidably received by the upper support, and extension structure connected between the arm and the upper support for providing mechanical advantage for sliding the arm relative to the upper support to adjust the working position of the implement when the gauge wheel structure is in contact with the ground.

8. The wheel structure as set forth in claim 7 wherein the extension structure comprises a removable storage jack which, when removed, is operable to support the implement in the parked position.

9. Wheel structure for attachment to a transversely extending frame member of an implement supporting tools and adapted to be stored in a parked position, towed forwardly over the ground in a raised transport position, and towed forwardly over a field in a lowered working position with tools engaging the soil, the wheel structure comprising:
a wheel frame;
bracket structure for selectively attaching the wheel frame at one of a plurality of positions along the frame member, the bracket structure including a lower support and an upper support and connecting structure extending between the upper and lower supports for mounting the bracket structure on the frame member;
a rearwardly extending lift wheel structure pivotally connected to the lower support;
forwardly extending gauge wheel structure connected to the upper support; a hydraulic cylinder connected between the upper support and the lift wheel structure and operable to pivot the lift wheel structure to move the implement between the raised transport position and the lowered working position, wherein in the lowered working position the gauge wheel structure and the lift wheel structure support the frame member and resist torsional moments caused by the engagement of the tools with the soil; and
wherein the upper support comprises a mast portion which, when the bracket member is attached, extends above the frame member, the mast including an arm support, and wherein the gauge wheel structure includes a gauge wheel arm adjustably received by the arm support.

10. The wheel structure as set forth in claim 9 wherein the arm is slidably received by the arm support, and jack structure extending between the mast portion and the gauge wheel structure for adjusting the working position of the implement.

11. The wheel structure as set forth in claim 10 wherein the jack structure comprises a storage jack selectively connectible between the mast portion and the gauge wheel and repositionable to support the implement in the parked position.

12. The wheel structure as set forth in claim 9 wherein the lift wheel structure includes a lift wheel arm member pivotally connected to the lower support for pivoting below the frame member; and wherein the gauge wheel arm is slidably received in the arm support above the frame member.

13. Wheel structure for converting an implement from an integrally mounted implement to a towed implement, the implement including a frame supporting tools and a transversely extending main frame member and having a center of gravity, the wheel structure comprising:
a wheel frame;
bracket structure for attaching the wheel frame to the frame member;
a rearwardly extending lift wheel structure pivotally connected to the wheel frame for rocking vertically below the frame member;
forwardly extending gauge wheel structure connected to the wheel frame forwardly of the lift wheel structure; a lift cylinder connected between the bracket structure and the lift wheel structure and operable to pivot the lift wheel structure to move the implement between a raised transport position and a lowered working position, wherein in the lowered working position the gauge wheel structure supports the frame and resists torsional moments caused by the engagement of the tools with the soil and in the transport position the lift wheel structure supports the implement behind the center of gravity; and
wherein the gauge wheel structure includes an arm slidably received by the bracket structure above the frame member.

14. The wheel structure as set forth in claim 13 including a jack device connected between the arm and the bracket structure for sliding the arm relative to the bracket structure to adjust the working position of the implement.

15. The wheel structure as set forth in claim 13 wherein the lift wheel structure also supports the frame in the lowered working position and limits front to back oscillations of the frame while the implement is in the lowered working position.

16. A deep tillage implement having a center of gravity and including a frame, hitch structure pivotally connected to the frame for towing the implement in a forward direction over the ground, first and second wheel modules transversely spaced on the frame, each wheel module including: a mounting bracket attaching the wheel module to the frame, rearwardly extending lift wheel including a wheel arm connected to the bracket and a lift wheel connected to the wheel arm behind the center of gravity of the implement, a cylinder connected between the bracket and the wheel arm for raising and lowering the lift wheel relative to the frame and moving the frame between a raised transport position and a lowered working position, a gauge wheel extending forwardly from the bracket, and gauge wheel adjustment structure for raising and lowering the gauge wheel relative to the frame to adjust the working position of the implement, the wheel modules thereby providing transport support behind the center of gravity of the implement for transport stability and forward support in the working position offsetting tillage moments tending to rotate the frame downwardly in the forward direction.

17. The deep tillage implement set forth in claim 16 further comprising a hydraulic circuit connected to the first and second wheel modules, the hydraulic circuit including hydraulic lines connecting the cylinder of the first wheel module in parallel with the cylinder of the second wheel module to a source of hydraulic fluid under pressure, and check valve structure connected to the cylinders and preventing uneven loads on the cylinders from changing relative extension of the cylinders so the cylinders remain in phase under the uneven loads.

18. The deep tillage implement set forth in claim 16 wherein the lift wheel and the gauge wheel are connected to the mounting bracket for relative independent vertical movement, and wherein the gauge wheel and the lift wheel are moveable with the bracket as a unit to different locations along the frame.

19. The deep tillage implement set forth in claim 17 wherein the check valve structure includes means preventing flow from the cylinders when the hydraulic lines are disconnected from the source of hydraulic fluid under pressure.

* * * * *